United States Patent
Salter et al.

(10) Patent No.: US 9,855,799 B2
(45) Date of Patent: Jan. 2, 2018

(54) FUEL LEVEL INDICATOR

(71) Applicant: Ford Global Technologies, LLC, Dearborn, MI (US)

(72) Inventors: Stuart C. Salter, White Lake, MI (US); James J. Surman, Clinton Township, MI (US); Pietro Buttolo, Dearborn Heights, MI (US); Paul Kenneth Dellock, Northville, MI (US); Tom Boettger, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/019,458

(22) Filed: Feb. 9, 2016

(65) Prior Publication Data

US 2017/0225615 A1    Aug. 10, 2017

(51) Int. Cl.
| | |
|---|---|
| *B60Q 1/00* | (2006.01) |
| *B60C 9/00* | (2006.01) |
| *G08B 5/36* | (2006.01) |
| *B60L 11/18* | (2006.01) |
| *G08B 21/18* | (2006.01) |

(52) U.S. Cl.
CPC ............ *B60C 9/00* (2013.01); *B60L 11/1861* (2013.01); *G08B 5/36* (2013.01); *G08B 21/182* (2013.01)

(58) Field of Classification Search
CPC ........ B60Q 3/023; B60Q 1/2661; B60Q 1/06; B60Q 1/22; B60Q 1/2665; B60Q 1/503; B60Q 1/54; B60Q 3/0269; B60Q 9/00; B60Q 1/323; B60Q 1/50; B60Q 2400/10; B60Q 3/008; B60Q 3/0209; B60Q 3/0253

USPC ....... 340/450.2, 450, 488, 538.16, 555, 571, 340/618, 632, 691.6, 7.38, 309.16, 332, 340/815.43, 815.45, 815.56

See application file for complete search history.

(56) References Cited

U.S. PATENT DOCUMENTS

| | | | |
|---|---|---|---|
| 2,486,859 A | | 11/1949 | Meijer et al. |
| 4,244,210 A | * | 1/1981 | Prohaska ................ G01F 9/008 73/114.54 |
| 5,053,930 A | | 10/1991 | Benavides |
| 5,709,453 A | * | 1/1998 | Krent ................... B60Q 1/0011 362/100 |
| 5,839,718 A | | 11/1998 | Hase et al. |
| 6,031,511 A | | 2/2000 | DeLuca et al. |
| 6,117,362 A | | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Daniel Previl
(74) *Attorney, Agent, or Firm* — Jason Rogers; Price Heneveld LLP

(57) ABSTRACT

An indicator disposed proximate a fuel port of the vehicle is disclosed. The indicator comprises a persistent luminescent layer, a first light source, and one or more circuits. The persistent luminescent layer is configured to emit a first color of light. The first light source is configured to emit a charging emission to charge the persistent luminescent layer. The one or more circuits are configured to selectively activate one or more portions of the first light source such that the persistent luminescent layer is charged and illuminates the indicator in the first color.

20 Claims, 4 Drawing Sheets

(56) References Cited

U.S. PATENT DOCUMENTS

| | | | |
|---|---|---|---|
| 6,192,612 B1 * | 2/2001 | Maier | F41A 1/04 42/54 |
| 6,364,498 B1 | 4/2002 | Burbank | |
| 6,375,864 B1 | 4/2002 | Phillips et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,739,844 B1 * | 5/2004 | Yu | F04D 5/002 415/55.1 |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 * | 7/2011 | Flores | B60Q 3/0233 340/435 |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0066644 A1 | 4/2004 | Chang | |
| 2004/0213088 A1 | 10/2004 | Fuwausa | |
| 2006/0087826 A1 * | 4/2006 | Anderson, Jr. | B60K 35/00 362/23.01 |
| 2006/0097121 A1 | 5/2006 | Fugate | |
| 2007/0032319 A1 | 2/2007 | Tufte | |
| 2007/0284169 A1 * | 12/2007 | Zabiega | B60K 35/00 180/90 |
| 2007/0285938 A1 | 12/2007 | Palmer et al. | |
| 2007/0297045 A1 | 12/2007 | Sakai et al. | |
| 2009/0126827 A1 * | 5/2009 | Guendouz | B60K 15/0406 141/312 |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2011/0095232 A1 | 4/2011 | Mahany | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0188779 A1 * | 7/2012 | Schultz | B60K 37/02 362/488 |
| 2012/0280528 A1 | 11/2012 | Dellock et al. | |
| 2013/0092965 A1 | 4/2013 | Kijima et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0204128 A1 * | 7/2014 | Jiang | G02F 1/133617 345/690 |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0187169 A1 * | 6/2016 | Gil Paredes | G01D 13/265 116/288 |
| 2016/0236613 A1 | 8/2016 | Trier | |

FOREIGN PATENT DOCUMENTS

| | | |
|---|---|---|
| CN | 201193011 Y | 2/2009 |
| CN | 204127823 U | 1/2015 |
| CN | 104617629 A | 5/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

* cited by examiner

FUEL LEVEL INDICATOR

FIELD OF THE INVENTION

The present invention generally relates to a lighting apparatus and more specifically relates to a lighting apparatus for a vehicle.

BACKGROUND OF THE INVENTION

Modern vehicles utilize various systems to improve convenience and ease of use. Some vehicles may utilize various illumination devices to enable an operator to identify a fuel level of a vehicle.

SUMMARY OF THE INVENTION

According to one aspect of the present invention, an indicator disposed proximate a fuel port of the vehicle is disclosed. The indicator comprises a persistent luminescent layer, a first light source, and one or more circuits. The persistent luminescent layer is configured to emit a first color of light. The first light source is configured to emit a charging emission to charge the persistent luminescent layer. The one or more circuits are configured to selectively activate one or more portions of the first light source such that the persistent luminescent layer is charged and illuminates the indicator in the first color.

According to another aspect of the present invention, a fuel level indicator for a vehicle is disclosed. The fuel level indicator comprises an indicator, a persistent luminescent layer, a first light source, and a second light source. The indicator is disposed substantially around a fuel door of the vehicle. The persistent luminescent layer is configured illuminate the indicator in a first color. The first light source is configured to illuminate the indicator in at least a second color, and the second light source is configured sequentially charge a portion of the persistent luminescent layer in a second color. The portion of the persistent luminescent layer charged by the second light source corresponds to the fuel level of the vehicle.

According to yet another aspect of the present invention, a charge indicator for a vehicle is disclosed. The indicator comprises a trim portion, a persistent luminescent layer, and a light source. The trim portion is of at least partially light transmissive material disposed substantially around a fuel port. The persistent luminescent layer is configured to emit a first color of light and forms a portion of the trim portion. The light source is configured to emit a charging emission charging the persistent luminescent layer and emit an output emission illuminating the trim portion in a second color.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized to clearly reference various elements of the disclosure.

Figure 1:
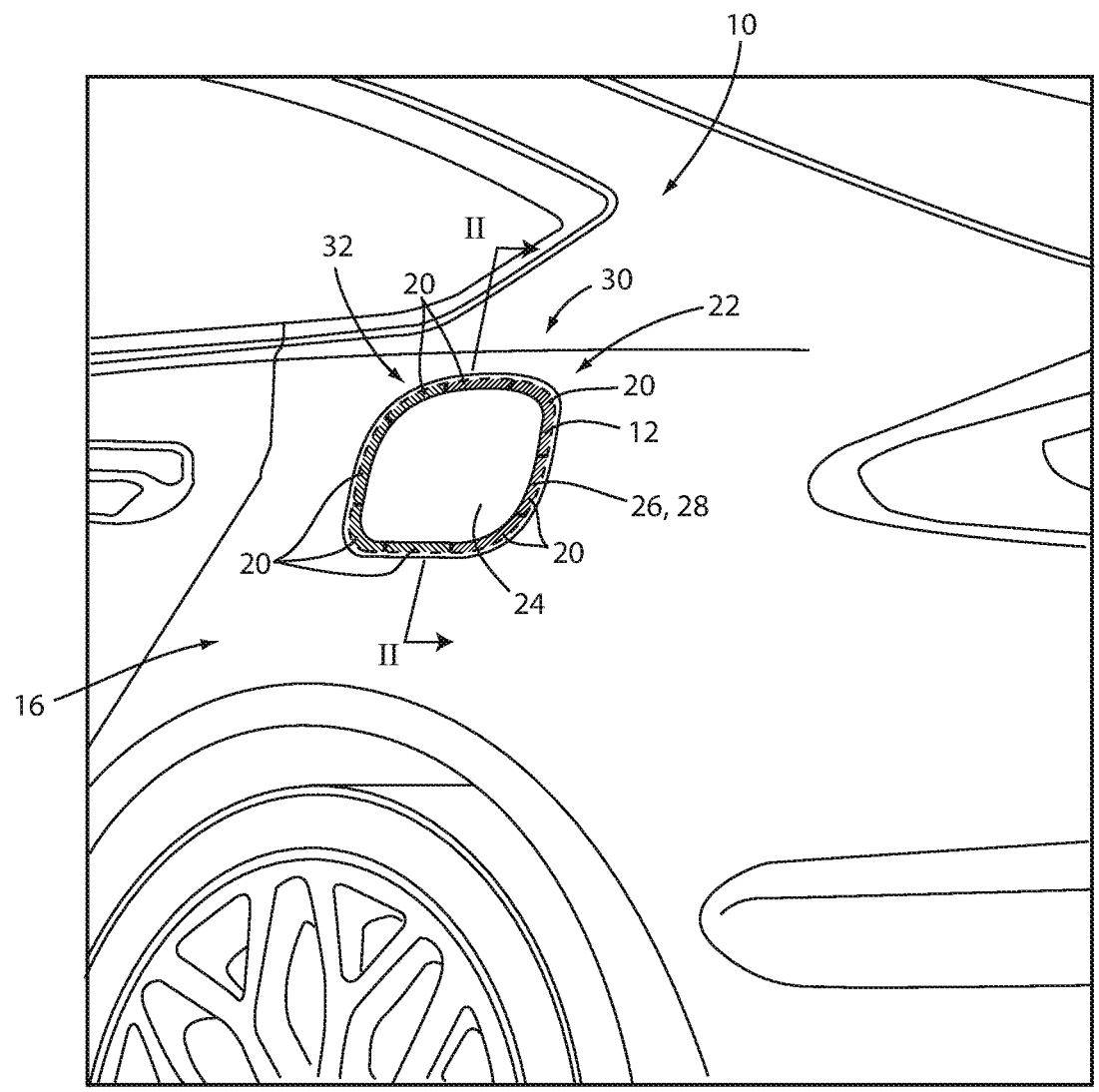
FIG. 1 is a perspective view of an exterior portion of a vehicle demonstrating a level indicator.

Referring to FIG. 1, the following disclosure describes an indication device 10 that may comprise a level indicator 12. The level indicator 12 may be utilized for various applications and may generally be configured to communicate a fuel level. In an exemplary embodiment, the level indicator 12 may be utilized to communicate a fuel level for a vehicle 14. The fuel level may be communicated by the level indicator 12 by illuminating a portion of an exterior portion 16 of the vehicle 14.

The indication device 10 may be in communication with a controller configured to selectively illuminate one or more segments or portions 20 of the level indicator 12. The portions 20 or segments illuminated may represent a fuel level of the vehicle 14. As described herein, a fuel level may correspond to a level of any form of fuel (e.g. electrical charge, gasoline, diesel, hydrogen, etc.) that may be utilized for the vehicle 14. As described herein, the level indicator 12 may be utilized as an illumination apparatus or notification device configured to communicate a fuel level of the vehicle 14.

Figure 2:
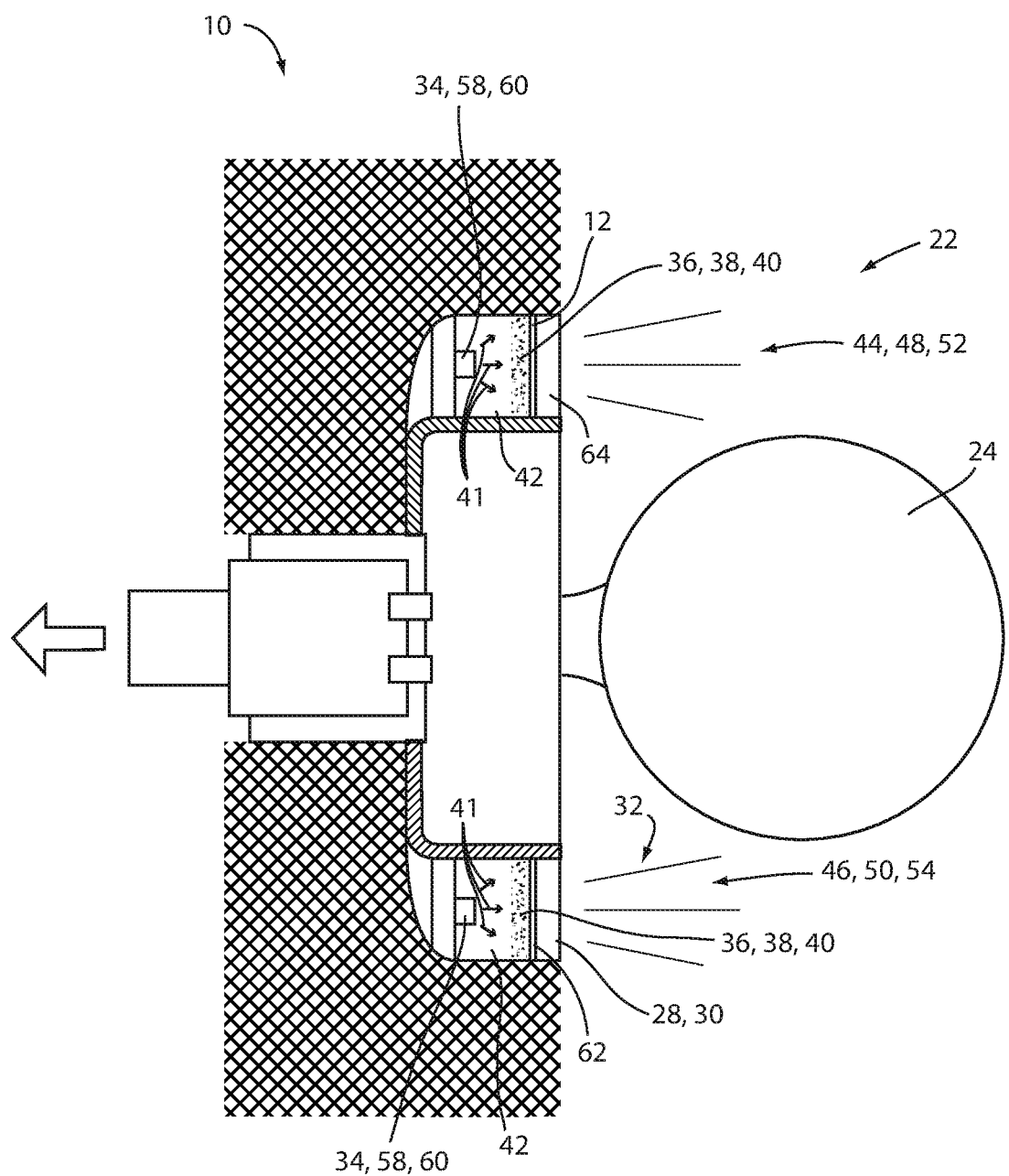
FIG. 2 is a cross-sectional view taken through line II-II of FIG. 1 further illustrating a fuel port comprising a level indicator.

FIG. 2 demonstrates a cross-sectional view of the level indicator 12 along section line II-II. Referring now to FIGS. 1 and 2, the exterior portion 16 of the vehicle 14 may correspond to various surfaces, panels, and/or portions of the vehicle 14. In some implementations, level indicator 12 may be disposed proximate a fuel port 22 of the vehicle 14. The fuel port 22 may comprise a fuel door 24 configured to selectively conceal the fuel port 22. As previously discussed, the fuel port 22 may be configured to receive fuel in various forms, for example liquid, gaseous, plasma, electrical current, etc. In this configuration, the level indicator 12 may provide for a flexible solution that may be used in a variety of applications.

In some embodiments, the level indicator 12 may be configured to at least partially surround the fuel door 24. The level indicator 12 may also be configured to be disposed on the exterior portion 16 of the vehicle 14, which may be remote from the fuel port 22. In an exemplary embodiment, the level indicator 12 may form a ring 26 or trim portion that substantially surrounds the fuel port 22. In various embodiments, the level indicator 12 may be configured to illuminate various portions of an illuminating surface 28. The portions of the illuminating surface may be illuminated in a first color, which may correspond to an accent light 30. Additionally, the illuminating surface 28 may be illuminated in a second color, which may correspond to a fuel level indication 32 of the vehicle 14.

To provide for the functionality of illuminating the level indicator 12 in the first color and/or the second color, the level indicator 12 may comprise an active light source 34 configured to selectively activate an emission of light from at least one passive light source 36. As discussed herein, each of the light sources (e.g. the active light source and the passive light source[s]) may be referred to as a first light source, a second light source, etc. for clarity. The active light source 34 may correspond to one or more light generating devices. The at least one passive light source 36 may correspond to one or more passive light sources (e.g. the first passive light source 38 and the second passive light source 40). The passive light source 36 may be provided as one or more luminescent materials configured to emit light. The active light source 34 may correspond to various forms of light sources that may be driven by electrical current or control signals (e.g. halogen lights, fluorescent lights, light emitting diodes (LEDs), etc.)

In order to communicate the level indication 32 of the vehicle 14, the controller may be in communication with a fuel sensor configured to communicate a fuel level of the vehicle 14. Based on the fuel level, the controller may activate the active light source 34 to selectively illuminate a portion of the level indicator 12. The controller may illuminate a variety of portions or segments of the level indicator 12 to communicate the level indication 32. A resolution of the level indicator 12 or the incremental illumination of various segments may correspond to a number of light sources forming the level indicator 12 and a spacing of the light sources. In this configuration, the controller may selectively illuminate the active light source 34 of the level indicator 12 to communicate a fuel level of the vehicle 14.

Referring now to FIG. 2, in some embodiments, the one or more passive light sources may correspond to a first passive light source 38 and a second passive light source 40. The first passive light source 38 may be illuminated via a first luminescent material. The second passive light source 40 may be illuminated via a second luminescent material. The luminescent materials may be disposed in a carrier layer 42 of the level indicator 12. In this configuration, the luminescent materials may be configured to receive at least one excitation emission 41 of light from the active light source 34. The excitation emission 41 may correspond to a wavelength configured to excite one or more of the luminescent materials of the passive light sources 38 and 40.

In some embodiments, the excitation emission 41 may be supplied by an excitation source of the active light source 34. In an exemplary embodiment, the excitation source may correspond to one or more light producing sources of the active light source 34 and may be configured to emit a blue, near ultra-violet, or ultra-violet light. The excitation emission 41 may correspond to a wavelength configured to excite and illuminate one or more luminescent materials of the first passive light source 38 and/or the second passive light source 40. In this configuration, the passive light sources 38 and 40 may be selectively illuminated by the controller in response to the activation of the excitation source of the active light source 34.

When the active light source 34, the first passive light source 38, and the second passive light source 40 are illuminated, each of the light sources may emit light in one or more colors. The active light source 34 may emit a first output emission 44 in a first color 46. The first passive light source 38 may emit a second output emission 48 in a second color 50. The second passive light source 40 may output a third output emission 52 in a third color 54. When multiple distinct colors or wavelengths of light are output by the active light source 34, the first passive light source 38, and/or the second passive light source 40, the wavelengths of light of each of the output emissions 44, 48, and 52 may mix together and be expressed as a multicolor or combined color of light. Though the active light source 34, the first passive light source 38, and the second passive light source 40 are discussed as being illuminated concurrently, one or more of the output emissions 44, 48, and 52 may be activated independently.

The active light source 34 may correspond to one or more light sources configured to emit the first output emission 44. Additionally, in some embodiments, the active light source 34 may be configured to emit one or more excitation emissions 41. The excitation emission 41 may correspond to one or more wavelengths of light at a first wavelength, which may correspond to an activation emission or charging emission of the first passive light source 38 and/or the second passive light source 40. In various embodiments, the active light source 34 may be configured to selectively illuminate one or more of light producing devices or sources. In this way, the controller may selectively activate an excitation source 58 of the active light source 34 to emit an excitation emission 41 and an output source 60 of the active light source 34 to emit the first output emission 44.

The luminescent materials may correspond to transient or persistent luminescent materials, which may be disposed in the carrier layer 42. The indication device 10 may further comprise a optical waveguide 62 and an emissive portion 64, which may be molded over the light sources 36, 38, and 40. The optical waveguide 62 may be applied to or form at least a portion of the carrier layer 42. The optical waveguide 62 may correspond to a light diffusing fiber, for example a glass or polymeric optical fiber. The optical fiber may be substantially transparent and configured to bend or flex to conform to various shapes or profiles of the panel of the vehicle 14 and/or the fuel port 22. The optical fiber may be configured to emit the output emissions 44, 48, and 52 uniformly from the emissive portion 64. In this configuration, the output emissions 44, 48, and 52 may be output uniformly from the level indicator 12.

In some embodiments, the emissive portion 64 may comprise a light filtering layer or materials. The light filtering layer may be incorporated as an outer portion of the emissive portion 64 relative the active light source 34. The light filtering layer may be configured to inhibit light energy (e.g. environmental light or sunlight) from entering the carrier layer 42 and may correspond to a polymeric material comprising a glazing or coating of one or more light absorbing or reflecting materials. In this way, the filtering layer may prevent the charge or activation of the luminescent materials of the first passive light source 38 and the second passive light source 40 by light energy originating from outside the indication device 10. The controller may be operable to control the illumination of the first passive light source 38 and the second passive light source 40 via the selective activation of the light generating devices of the active light source 34.

In some embodiments, the emissive portion 64 may be arranged as a strip or in segments and may include one or more luminescent materials to form the first passive light source 38 and the second passive light source 40. The luminescent materials may be applied or otherwise arranged on the emissive portion 64 or the carrier layer 42 or interspersed therein. The light producing devices of the active light source 34 may be configured to emit the excitation emission 41 into the carrier layer for exciting the luminescent materials disposed in the emissive portion 64. More specifically, light emitted from the excitation source may reach the emissive portion 64, where the excitation emission 41 may be converted to the second output emission 48 and/or the third output emission 52 by the one or more luminescent materials. The light sources of the active light source 34 may be disposed on a circuit board (e.g. a flexible circuit board) that is coupled a substrate. The substrate may be connected to the vehicle 14 to secure the indication device.

Though described in detail incorporating the luminescent materials, in some embodiments, the lighting system indication device may utilize various forms of light sources and may not incorporate the luminescent materials. For example, the light sources 34 may correspond to various forms of light sources. The light sources 34 may correspond to halogen lighting, fluorescent lighting, light emitting diodes (LEDs), red-green-blue (RGB) LEDs, organic LEDs (OLEDs), polymer LEDs (PLEDs), solid state lighting or any other form of lighting configured to generate light.

As discussed herein, the luminescent material(s) may be applied as a coating and/or dispersed in a material forming the surface or the carrier layer 42 of the level indicator 12. In an exemplary embodiment, the first passive light source 38 may be formed by a persistent luminescent material configured to charge in response to receiving the excitation emission 41. The second passive light source 40 may be formed of a transient luminescent material configured to convert the excitation emission 41 but not to hold a substantial charge. That is, transient luminescent materials may be utilized for the second passive light source 40 and configured to emit light in response to receiving the excitation emission 41 for only a short duration after the excitation emission 41 is deactivated. A short duration as may correspond to a period of time less than 5 minutes and may correspond to times less than 1 minute, 30 seconds, 10 seconds or less depending on the particular properties of the transient luminescent materials.

Each of the second output emission 48 and the third output emission 52 may correspond to luminescence light, which may be in the form of transient luminescence and/or persistent luminescence. As utilized herein, both transient luminescence and persistent luminescence may correspond to light emitted from a luminescent portion. Persistent luminescence may be distinguished from transient luminescence as described herein due to a continued emission of light or luminescence being emitted from a persistent luminescent material. As discussed herein, the first passive light source 38 may correspond to a persistent passive light source comprising persistent luminescent materials. For example, the first passive light source may be configured to emit the second output emission 48 for a significant period of time following the deactivation of the excitation emission 41. A significant period of time may correspond to a duration exceeding approximately 5 minutes, but may correspond to a period of time up to or exceeding 60 minutes.

In some embodiments, one or more of the output emissions 44, 48, and 52 may correspond to a plurality of wavelengths. The wavelength(s) corresponding to each of the output emissions 44, 48, and 52 may correspond to significantly different spectral color ranges. In this way, each of the output emission 44, 48, and 52 may be configured to emit light in the first color 46, the second color 50, and the third color 54. The plurality of wavelengths may be generated by a red-emitting luminescent material having a wavelength of approximately 620-750 nm, a green emitting luminescent material having a wavelength of approximately 526-606 nm, and a blue or blue green emitting luminescent material having a wavelength of approximately 400-525 nm.

The persistent luminescent materials as discussed herein may correspond to phosphorescent materials. Persistent luminescent materials may correspond to alkaline earth aluminates and silicates, for example doped (di)silicates. Such substances may incorporate persistent luminescent phosphors or other doped compounds. Persistent luminescent substances may be doped with one or more ions, which may correspond to rare earth elements, for example: $Eu^{2+}$, $Tb^{3+}$, $Dy^{3+}$, and $R^{3+}$. Persistent luminescent materials may be defined as being operable to carry a charge and discharge light for a period of several minutes. For example, persistent luminescent materials as described herein may have an afterglow decay time longer than several minutes. The decay time may be defined as the time between the end of the excitation and the moment when the light intensity of the luminescent material drops below a minimum visibility of 0.32 mcd/m$^2$. The minimum visibility is roughly 100 times the sensitivity of the dark-adapted human eye, which corresponds to a definition used in the safety signage and by various researchers of luminescent properties.

A persistent luminescent material as discussed herein may be operable to emit light at an intensity of 0.32 mcd/m$^2$ after a decay time of 10 minutes. In an exemplary embodiment, a persistent luminescent material may be operable to emit light at an intensity of 0.32 mcd/m$^2$ after a decay time of 30 minutes and in some embodiments for a period longer than 60 minutes. In an exemplary embodiment, a persistent luminescent material may have a luminance ratio of greater than or equal to 20 % of a first intensity after 10 minutes of decay time relative to a second intensity after 30 minutes of decay time. Additionally, in some embodiments, a persistent luminescent material may have a luminance ratio of greater than or equal to 10% of a first intensity after 10 minutes of decay time relative to a second intensity after 60 minutes of decay time.

As discussed herein, persistent luminescent materials may be operable to store energy received from the excitation emission 41 or a corresponding wavelength of light. The stored energy may then be emitted from the persistent luminescent material for a wide range of times, some extending up to approximately 24 hours. Such materials, when utilized in the luminescent portions discussed herein make it possible to sustain light from the luminescent portions by periodically emitting the excitation emissions 41 from the active light source 34. The periodic emission of the excitation emissions 41 may provide for a substantially sustained charge of the persistent luminescent materials to provide for a consistent ambient illumination of the first passive light source 38.

The transient luminescent materials discussed herein may correspond to organic or inorganic fluorescent dyes configured to convert the excitation emission 41 to output emissions. For example, the transient luminescent materials may comprise a luminescent structure of rylenes, xanthenes, porphyrins, phthalocyanines, or other materials suited to a particular Stokes shift defined by an absorption range and an emission fluorescence. In some embodiments, the transient luminescent materials may be of at least one inorganic luminescent material selected from the group of phosphors. The inorganic luminescent material may more particularly be from the group of Ce-doped garnets, such as YAG:Ce. As such, each of the luminescent portions may be selectively activated by a wide range of wavelengths received from the excitation emission 41 configured to excite one or more luminescent materials to emit an output emission having a desired color.

Each of the luminescent materials may comprise one or more transient luminescent and/or persistent luminescent materials. The luminescent materials may be utilized in the indication device on various surfaces of the vehicle 14. Additional information regarding the construction of luminescent structures to be utilized in at least one luminescent portion is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

The light sources of the active light source 34 as described herein may correspond to various forms of light source or light generating device. For example, the light sources 34 may correspond to one or more light generating devices such as halogen lights, fluorescent lights, light emitting diodes (LEDs), organic LEDs (OLEDs), polymer LEDs (PLEDs), red-green-blue (RGB) LEDs, solid state lighting or any other form of lighting. As such, the light sources may be configured to emit a variety of wavelengths of light, some of which may correspond to the excitation emission 41.

Figure 3:
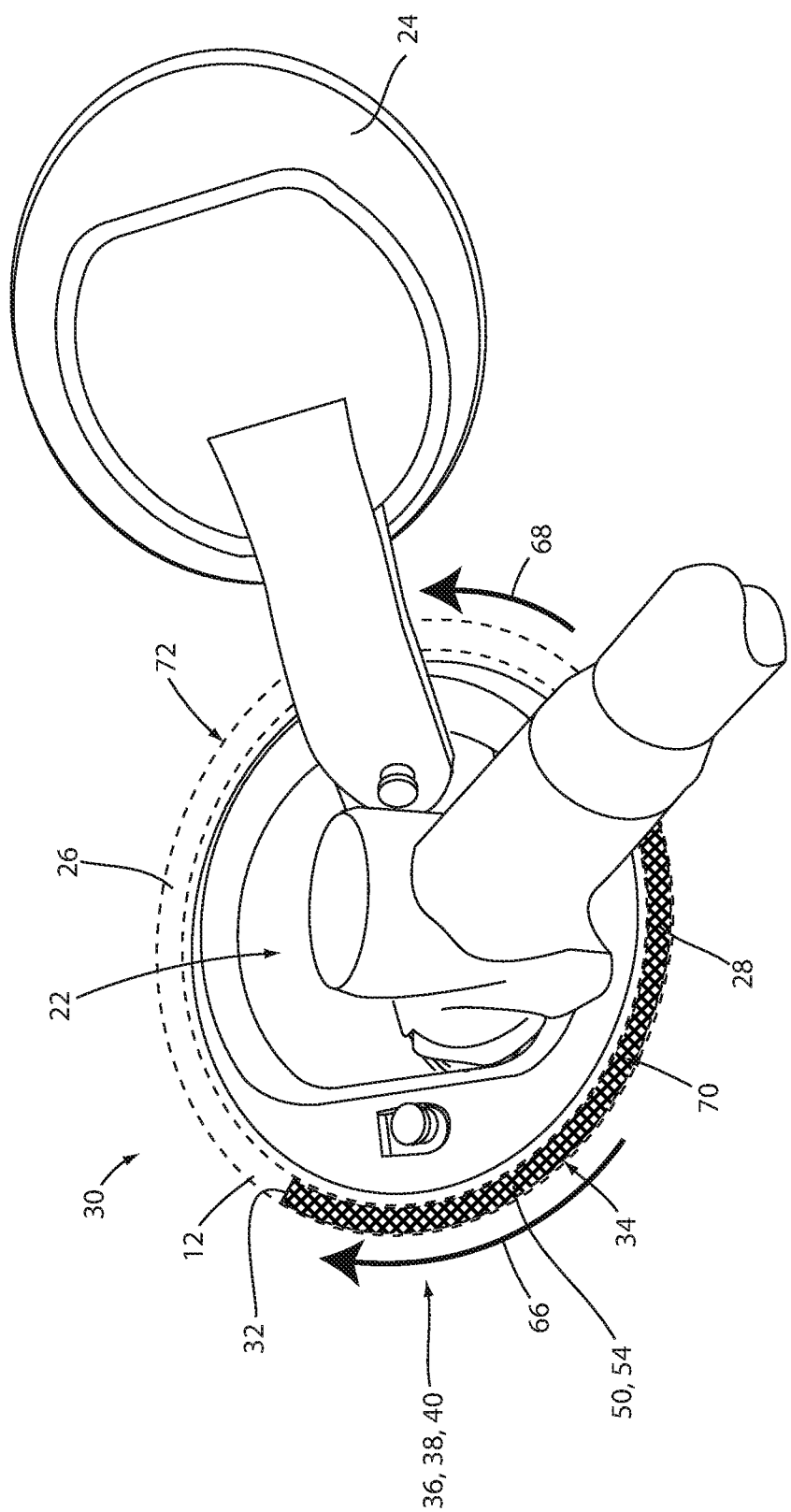
FIG. 3 is a detailed perspective view of a fuel port comprising a level indicator.

Referring now to FIG. 3, a detailed perspective view of the level indicator 12 is shown demonstrating a refueling or charging operation. During the charging operation, the level indicator 12 may selectively activate the excitation emission 41 from the active light source 34 to illuminate the first passive light source 38 and/or the second passive light source 40. In an exemplary embodiment, the first passive light source 38 and the second passive light source 40 may be illuminated in response to the excitation emission 41. As discussed previously, the first passive light source 38 may comprise persistent luminescent material, and the second passive light source 40 may comprise transient luminescent material. In this configuration, the persistent luminescent material of the first passive light source 38 may be charged by the excitation emission 41 while the vehicle 14 is refueling or charging.

The controller may selectively activate the active light source 34 to illuminate a portion of the level indicator 12 corresponding to a current charge of the vehicle 14 as denoted by a first arrow 66. During the charging operation, the excitation emission 41 may cause the first passive light source 38 to emit the second color 50 of light and the second passive light source 40 to emit the third color 54 of light. Consequently, the combination of the second color 50 and the third color 54 may blend to form a fourth color. In this way, the fourth color may be associated with the charging or refueling operation of the vehicle.

Once the charging operation is complete, the controller may deactivate the excitation emission 41 via the active light source 34. In response to the excitation emission 41 being deactivated, the second passive light source 40 may no longer output the third output emission 52 in the third color 54, but the first passive light source 38 may continue to emit the second output emission 48. In this way, a discharging operation of the first passive light source 38 may provide for the level indicator 12 to demonstrate a current charge level in the second color 50. As the vehicle is used, the first passive light source 38 may discharge in the direction of a second arrow 68 to communicate the discharge of the power source or fuel source of the vehicle 14. The first passive light source 38 may discharge in the direction of the second arrow 68 because the time for receiving the excitation emission 41 may be shorter for a second portion 72 of the level indicator 12 than for a first portion 70 of the level indicator 12. The second portion 72 may correspond to a portion of the level indicator 12 demonstrating a higher level of charge than the first portion 70.

The current charge level demonstrated by the level indicator 12 may also be controlled by selectively activating the excitation emission 41 periodically during the discharge of the power source or fuel source of the vehicle 14. Accordingly, the persistent luminescent material of the first passive light source 38 may be selected such that a discharge rate of the persistent luminescent material is greater than or equal to a discharge rate of the power source or fuel source of the vehicle 14. In this configuration, the controller may periodically activate the excitation emission 41 to charge the persistent luminescent material of the first passive light source 38 corresponding to a charge level of the vehicle 14.

During one or more periodic charges of the persistent luminescent material of the first passive light source 38, the controller may activate the first output emission 44 from the active light source 34 such that the level indicator 12 emits a fifth color of light. In such embodiments, the active light source may comprise one or more light sources configured to emit a plurality of colors of light (e.g. RGB LEDs). The fifth color of light may be similar to the second color 50 of the second output emission 48. In this way, the color of light emitted from the level indicator 12 may appear to correspond to the second color 50 when the controller is charging the first passive light source 38. The combination of the first output emission 44 and the second output emission 48 may provide for a combined output color from the level indicator to appear similar to a color of the second emission 48 while the vehicle is not being charged or refueled and a periodic charge is occurring.

In some embodiments, the indication device 10 may comprise one or more indicator light sensors configured to detect a level of charge and/or activated portion of the persistent luminescent material of the first passive light source 38. In this configuration, the controller may be configured to receive feedback from the indicator light sensors to identify a portion of the level indicator 12 illuminated by the first passive light source 38. In this way, the controller may periodically charge the persistent luminescent material of the first passive light source 38 to accurately represent the charge level of the vehicle 14 with the level indicator 12.

In some embodiments, the active light source 34 may be selectively activated by the controller to emit the first output emission 44 in the first color 46 in response to one or more states of the vehicle 14. For example, the controller may activate the active light source 34 to emit the first output emission 44 in response to the following vehicle states or events: a low fuel level indication, a door lock/unlock event, a fuel door open notification, an ignition state, a drive gear selection, or various other vehicle states or events. In this configuration, the indication device 10 may be configured to communicate a charge level of the vehicle 14 and may also be configured to communicate additional vehicle state or event information.

Figure 4:
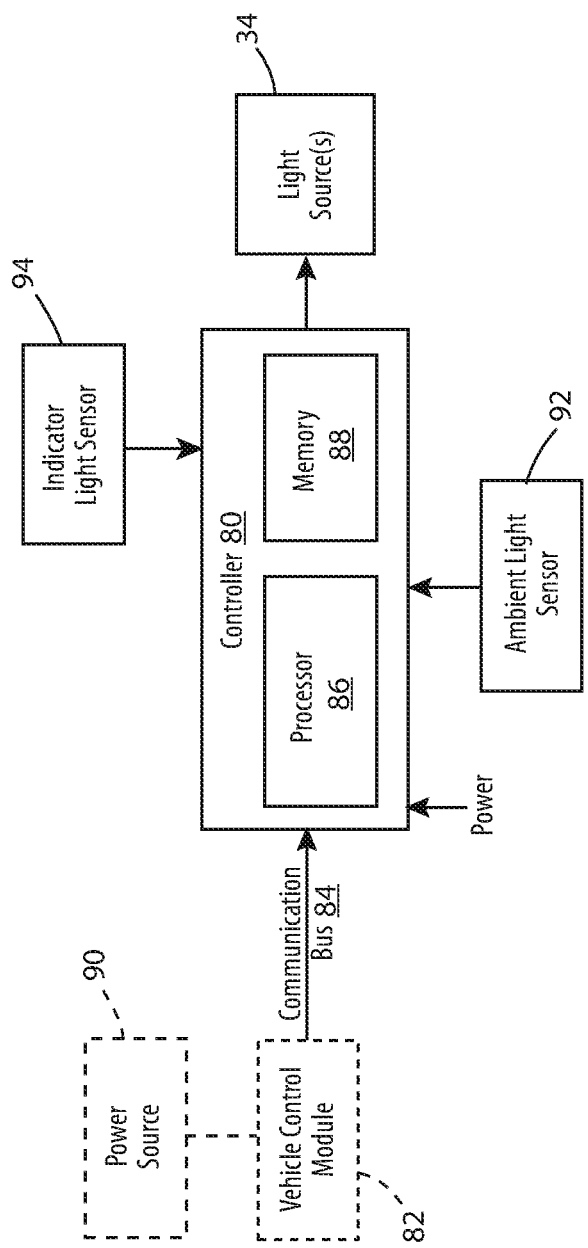
FIG. 4 is a block diagram of a controller configured to control an illumination apparatus in the form of a level indicator in accordance with the disclosure.

Referring to FIG. 4, a block diagram of a controller 80 configured to control the lighting device 10 is shown. The controller 80 may be in communication with a vehicle control module 82 via a communication bus 84 of the vehicle 14. The communication bus 84 may be configured to deliver signals to the controller 80 identifying various states of the vehicle 14. For example, the communication bus 84 may be configured to communicate an operating condition of the vehicle 14 (e.g. the ignition is active), an ambient light level, a seat occupancy, a door ajar signal, a gear selection, a fuel level indication, a door lock/unlock event or any other information or control signals that may be communicated via the communication bus 84. In this way, the controller 80 may selectively activate the active light source 34 in response to one or more conditions communicated by the vehicle control module 82.

The controller 80 may include a processor 86 comprising one or more circuits configured to receive the signals from the communication bus 84 and output signals to control the light sources 34 and 36 discussed herein. The processor 86 may be in communication with a memory 88 configured to store instructions to control the activation of the light sources. The processor 86 may receive various signals and/or messages corresponding to vehicle conditions via the communication bus 84. In this way, the controller 80 may be configured to receive an indication of fuel level of a fuel source 90 of the vehicle 14.

The controller 80 may further be in communication with an ambient light sensor 92 and an indicator light sensor 94. Each of the sensors 92 and 94 may be configured to communicate signals to the controller 80 such that the controller 80 may identify the ambient light level proximate the vehicle 14 and the illumination status of the first passive light source 38, respectively. The light sensors 92 and 94 may correspond to various forms of sensors, for example charge coupled devices CCDs, photodiodes, etc. Based on the inputs from the sensors 92 and 94, as well as communications received via the communication bus 84, the controller 80 may selectively charge/activate each of the light sources 34 and 36 based on various states of the vehicle 14.

The ambient light sensor 92 may be operable to communicate a light condition, for example a level brightness or intensity of the ambient light proximate the vehicle 14. Additionally, the indicator light sensor 94 may be operable to communicate an illumination level or portion illuminated of the level indicator 12 by the first passive light source 38. In response to the level of the ambient light and/or the illumination of the level indicator 12, the controller 80 may be configured to adjust a light intensity or excitation emission 41 output from the each of the light generating devices of the active light source 34. In this way, the intensity of the light output from the light sources 34 and 36 may be adjusted by controlling a duty cycle, current, or voltage supplied to the light generating devices of the active light sources 34.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle indicator comprising:
   a persistent luminescent layer forming a trim ring extending around a fuel receiving port and configured to emit a first color of light;
   a first light source configured to emit a charging emission to charge the persistent luminescent layer; and
   circuitry configured to selectively activate a plurality of portions of the first light source, wherein the persistent luminescent layer is charged and illuminates the indicator in the first color.

2. The indicator according to claim 1, wherein the circuitry is further configured to receive a fuel level signal of the vehicle.

3. The indicator according to claim 2, further comprising a second light source configured to selectively illuminate the indicator in a second color.

4. The indicator according to claim 3, wherein the second light source is configured to emit the second color of light through the persistent luminescent layer and superimposed over the first color of light.

5. The indicator according to claim 3, wherein the plurality of portions illuminated by the first light source correspond to a fuel level of the vehicle identified from the fuel level signal.

6. The indicator according to claim 1, wherein the level indicator substantially encircles the fuel port.

7. The indicator according to claim 1, wherein the fuel receiving port comprises an electrical charge port configured to receive current charging a battery of the vehicle.

8. A vehicle fuel level indicator comprising:
   an indicator encircling a fuel door enclosing a fuel port;
   a persistent luminescent layer configured to illuminate the indicator in a first color;
   a first light source configured to illuminate the indicator in at least a second color; and
   a second light source configured to sequentially charge a portion of the persistent luminescent layer in a second color, the portion corresponding to the fuel level of the vehicle.

9. The fuel level indicator according to claim 8, further comprising a controller configured to selectively activate the first light source and the second light source.

10. The fuel level indicator according to claim 9, wherein the controller is configured to charge the persistent luminescent layer by controlling a frequency and timing of the activation of the second light source.

11. The fuel level indicator according to claim 9, further comprising an indicator light sensor in communication with the controller.

12. The fuel level indicator according to claim 11, wherein the controller is configured to charge the persistent luminescent layer to illuminate the fuel level indicator in response to a light signal received from the indicator light sensor communicating a charge level of the persistent luminescent layer.

13. The fuel level indicator according to claim 9, wherein the controller is further operable to receive a fuel signal configured to communicate a fuel level of the vehicle.

14. The fuel level indicator according to claim 13, wherein the controller is further operable to illuminate the portion of the persistent luminescent layer corresponding to the fuel level in response to a battery of the vehicle being charged in a charging operation.

15. A charge indicator for a vehicle comprising:
a trim portion of at least partially light transmissive material disposed substantially around a fuel port of the vehicle;
a persistent luminescent layer configured to emit a first color of light and form a portion of the trim portion; and
a light source configured to:
emit a charging emission charging the persistent luminescent layer; and
emit an output emission illuminating the trim portion in a second color.

16. The charge indicator according to claim 15, wherein the light source is configured to emit the charging emission and charge a portion of the persistent luminescent layer corresponding to a charge level of the vehicle.

17. The charge indicator according to claim 16, wherein the portion is sequentially illuminated by the light source as a plurality of segments of the trim portion.

18. The charge indicator according to claim 15, wherein the light source corresponds to a plurality of light emitting diodes disposed as a layer of the trim portion configured to emit light into the partially light transmissive material.

19. The charge indicator according to claim 15, wherein the light source is further configured to emit the second color of light through the trim portion in response to one or more vehicle conditions.

20. The charge indicator according to claim 15, wherein the persistent luminescent portion is configured to carry a charge and discharge the output emission for a period of several minutes.

* * * * *